UNITED STATES PATENT OFFICE.

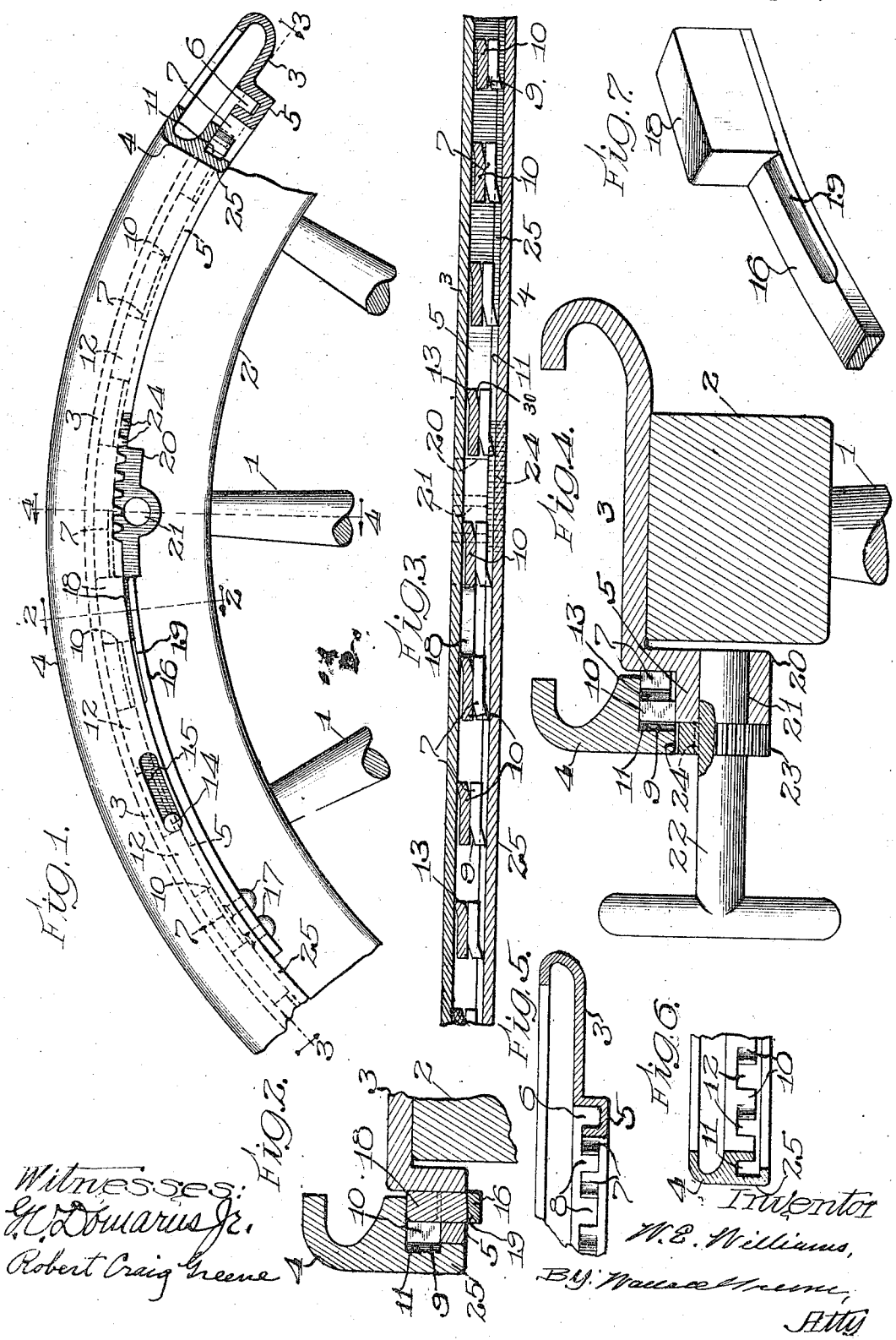

WILLIAM ERASTUS WILLIAMS, OF CHICAGO, ILLINOIS.

WHEEL-RIM 1,221,402.  Specification of Letters Patent.  Patented Apr. 3, 1917.

Application filed May 22, 1912. Serial No. 698,979.

*To all whom it may concern:*

Be it known that I, WILLIAM E. WILLIAMS, a citizen of the United States, residing at Chicago, county of Cook, State of Illinois, have invented new and useful Improvements in Wheel-Rims, of which the following is a specification.

My invention relates to rims adapted to be placed on common wheels, unchanged, and to receive resilient tires directly. The object is to provide a simple, inexpensive rim which will hold a tire securely and yet permit it to be conveniently removed and replaced, and in which the working parts are concealed and protected from foreign matter although the device as a whole is not conspicuously different from a simple, one-piece rim.

In the accompanying drawings,

Figure 1 is a side view of a portion of a wheel embodying my invention.

Fig. 2 shows in cross section a detachable rim section or member with a part of the companion member.

Fig. 3 is a section on the line 3—3, Fig. 1, looking in the direction of the arrows.

Fig. 4 is a section on the line 4—4, Fig. 1.

Fig. 5 is a perspective view, partly in section, showing a portion of the wheel rim, or body member thereof.

Fig. 6 is an analogous view showing a part of the detachable member of the rim.

Fig. 7 is a perspective detail view of certain locking devices. In these figures, 1 and 2 represent the spokes and felly of a common wheel, although the novel rim may be used on wheels of other types. 3 represents the body member and 4 a detachable, coacting member of the novel rim or felly band laterally hooked in the usual way to hold tires of the clencher type and adapted to fit an ordinary wheel and project on each side beyond its felly or equivalent part. On the side where the member 3 meets the companion member it is pressed inward, with respect to the wheel, to form at 5 and at one side of the plane of the felly an annular groove 6 having on the side most distant from the felly a flange parallel to the plane of the wheel and cut away at short intervals to form teeth 7 separated by spaces 8, Fig. 5. All these teeth are provided on one side with inclined surfaces 9 to facilitate engagement hereinafter noted.

The detachable member 4 has, on the side where it meets the member 3 an inwardly extending annular flange parallel to the one just described and like it cut away to form a set of teeth 10 separated by spaces 12 approximately equal in width to the teeth 7, and these teeth 10 also have marginal inclined surfaces 30 similar to the surfaces 9 but on opposite sides and oppositely turned, as shown in Fig. 3.

When the detachable member 4 is in proper position for moving into engagement with the member 3, that is when it is placed alongside its companion with the centers of both rings in the axis of the wheel hub and with the teeth of one member opposite the spaces between the teeth of the other member, it may be moved laterally toward its companion until its teeth pass to the opposite side of the plane of the teeth of the other set, each tooth in this movement passing barely through the notches or spaces between consecutive teeth of the other set. When this lateral movement is very nearly complete, forcible relative rotation of the two members causes the inclined surfaces 9, 30 to impinge, completing the sidewise movement by wedging action. By further rotation, each tooth passes behind the parallel body of a tooth of the other member and into non-wedging engagement, as shown in Fig. 3. The two members are thus interlocked in such relation that but for the joint between the two members and at one side of the plane of the felly, the tire-receiving portion of the rim is identical with a common form of one-piece rims; and obviously the two can be disengaged only by relative rotation.

To prevent the undesired occurrence of such rotation, a long spring 16 is fixed to the inner face of the portion 5 of the member 3 and provided at its free end with a lug 18 which passes through an opening in the member 3 and enters and laterally fills the space between consecutive teeth of the member 4, as shown in Fig. 3, thus locking the parts. This spring is beveled as shown at 19 so that it may be conveniently engaged and sprung to withdraw the lug from locking position.

The member 4 is provided with a second flange parallel to the first and separated from it by a space 11 and this flange, shown as provided with a lip, meets the inwardly pressed portion of the member 3 and is flush with the inner surface of the latter. When the two parts of the rim are locked together as described, the parts appear to be continuous and the teeth are hidden and protected from foreign matter.

As a guide in bringing the teeth of one member into registry with the spaces between the teeth of the other set and for having an always visible indication of the relative positions of the two sets, the member 3 is provided with a rigid stud 14 which projects into a slot 15 in the member 4. When this stud is at one end of the slot, the desired registry is secured, and when it is at the opposite end the interlocking is known to be complete.

For applying great force in rotating the two members relatively without being obliged to hold either rigidly, a block 20 is fixed to the member 3 at one side of the plane of the other member and in it is formed a bearing 21 for the shaft or gear wrench 22, the pinion 23 of which engages a short gear segment or rack 24 formed in the inner margin of the member 4. Obviously inserting the wrench shaft in the bearing and rotating it compels relative rotation for locking or unlocking, according to the direction of movement.

What I claim is:

1. A two-part tire-receiving rim adapted to fit around a felly and consisting of a body member pressed inward near one margin to form an outwardly open annular groove alongside the plane of the felly, and a co-acting detachable flange member adjacent to said margin and provided with two parallel annular flanges, one in position to lie in said groove and the other in position to lie alongside the outer wall of said groove, said flange lying within the groove and said wall being cut away to form sets of teeth, the teeth of each set being arranged to pass between the teeth of the other set and to engage them by relative rotation.

2. The combination with an annular rim member having at one side tire retaining means and at the other side an inwardly extending outwardly open, circumferential groove with its free wall serrated to form a set of outwardly projecting teeth, of a coacting tire engaging rim member having a set of inwardly projecting teeth in position to pass between the teeth first mentioned and engage them by relative rotation and further having an inwardly projecting flange fitting against the outer side of said serrated wall and covering both sets of teeth.

In witness whereof I have hereunto subscribed my name at the city of Chicago on this 31st day of May, 1911, in the presence of two subscribing witnesses.

WILLIAM ERASTUS WILLIAMS.

Witnesses:
WINFIELD S. WILLIAMS,
F. C. MILLER.

Copies of this patent may be obtained for five cents each, by addressing the "Commissioner of Patents, Washington, D. C."